(12) United States Patent
Chen

(10) Patent No.: US 6,665,401 B1
(45) Date of Patent: Dec. 16, 2003

(54) METHOD FOR CANCELING ECHO

(75) Inventor: Yueh-Chang Chen, Hsinchu Hsien (TW)

(73) Assignee: Winbond Electronics Corp., Hsinchu (TW)

(*) Notice: Subject to any disclaimer, the term of this patent is extended or adjusted under 35 U.S.C. 154(b) by 0 days.

(21) Appl. No.: 09/543,007

(22) Filed: Apr. 4, 2000

(30) Foreign Application Priority Data

Feb. 25, 2000 (TW) .......................... 89103351 A

(51) Int. Cl.$^7$ ................................ H04M 1/00
(52) U.S. Cl. .................... 379/406.02; 379/406.06; 708/322
(58) Field of Search ............... 379/406.01, 406.02, 379/406.04, 406.06, 406.08, 406.11; 708/300, 322

(56) References Cited

U.S. PATENT DOCUMENTS 6,035,034 A * 3/2000 Trump ................. 379/406.06
6,532,289 B1 * 3/2003 Magid ................. 379/406.01
6,608,897 B1 * 8/2003 Jin et al. .............. 379/406.09

* cited by examiner

Primary Examiner—Minsun Oh Harvey
Assistant Examiner—Jefferey Harold
(74) Attorney, Agent, or Firm—J.C. Patents

(57) ABSTRACT

A method for canceling echo. A threshold value signal is set to a preset value and the threshold value signal and a medium value signal are keep at a level of the preset value. Diagnosis is made as to whether a difference between an echo signal (I) and the medium value signal (I-1) is more than a positive threshold value or less than a negative threshold value. When the difference between an echo signal (I) and the medium value signal (I-1) is more than the positive threshold value, the level of the medium value signal (I) is increased by an upraise speed and the level of the threshold value signal (I) is increased by a first speed faster than the upraise speed. When the difference between the echo signal (I) and the medium value signal (I-1) is less than the negative threshold value, the level of the medium value signal (I) is decreased by a drop speed and the level of the threshold value signal (I) is decreased by a second speed faster than the drop speed. When the difference between the echo signal (I) and the medium value signal (I-1) is not more than the positive threshold value or not less than the negative threshold value, which represents the level of the echo signal (I) in an normal range without adjusting the threshold value, the symbol (I) represents a present condition of a corresponding signal and the symbol (I-1) represents a previous condition of a corresponding signal.

7 Claims, 4 Drawing Sheets

METHOD FOR CANCELING ECHO

CROSS-REFERENCE TO RELATED APPLICATION

This application claims the priority benefit of Taiwan application serial no. 89103351, filed Feb. 25, 2000.

BACKGROUND OF THE INVENTION

1. Field of the Invention

The present invention relates to a method for canceling echo. More particularly, the present invention relates to a method for canceling echo, by which echo can be canceled successfully when the echo is very large.

2. Description of the Related Art

An echo canceller is commonly used in a handset of a phone to eliminate unnecessary echo. For example, while transferring a two-line system to a four-line system in a telephone network, an echo occurs if the impedance matching is not met, or, in a speaker phone, the voice is reflected in the chamber-like space to produce an echo. However, the conventional echo canceller can only eliminate the echo in one direction. Only during a one-directional talk (the direction that produces the echo) can the echo canceller adjust a coefficient for eliminating the echo. However, when the coefficient is not ideally convergent, a double talk detector is required to detect the one-direction talk.

Various methods of fabricating double talk detectors have been developed. In the following paragraphs, two common types of double talk detectors are introduced.

As shown in FIG. 1, a conventional echo canceller 14 is coupled between a receiving line (input line) 10 and an output line 12. The receiving line 10 has a terminal used as a first input terminal 16 for receiving an external input signal Rin and a terminal used as a first output terminal 18 for an external output signal Rout. The output line 12 has a terminal used as a second input terminal 20 for an acoustic input signal Sin and a terminal used as a second output terminal 22 for an acoustic output signal Sout. The external output signal Rout is output via a receiving set 24 while the microphone 26 outputs the acoustic input signal Sin at the second input terminal 20. Between the receiving set 24 and the microphone 26, the output signal of the receiving set 24 overlaps with the acoustic input signal Sin to cause an echo 28. Meanwhile, the double talk detector of the echo canceller has to start detecting to effectively eliminate the echo 28.

For a first type of double talk detector in a echo canceller, when the acoustic input signal Sin has a magnitude larger a half of the external output signal Rout, it is thus determined as a double talk that immediately freezes the coefficient adjustment of the echo canceller. This method can be applied as a line echo canceller. However, this kind of echo canceller cannot be applied to an echo canceller required for a receiving set since the distance between the speaker and the microphone is variable and causes variable magnitudes of echoes.

A second type of double talk echo canceller determines the value of echo return loss enhancement (ERLE), wherein $$ERLE = Sin/Sout$$

When ERLE is larger than a certain constant, the echo coefficient is adjusted. In this manner, ERLE can effectively determine when the coefficient is convergent. However, before being convergent, an error can latch up the coefficient of the echo cancellation. The echo coefficient thus can never be converged.

FIG. 2 shows a detailed structure of a conventional echo canceller 14 in FIG. 1.

In FIG. 2, the echo canceller 14 comprises two voice detectors 30 and 32, a double talk detector 34, an echo return loss enhancement device 36, an adaptive filter 38 and a subtractor 40. According to the structure of FIG. 2, the acoustic output from the receiving set 24 may be transmitted to the microphone 26 via space collision to cause an echo. Because the space characteristic may be changed momentarily, the adaptive filter 38 is required for tracking the impulse response of an echo. However, the reason for turning on the adaptive filter 38 as well as a study mechanism is the edge of line talked and the edge of air untalked; thus, the acoustic is determined from the edge of air to be an echo and the adaptive filter 38 is turned on. Therefore, in FIG. 2, the voice detectors 30 and 32 are used for determining whether the edge of line and air are talked, and the double talk detector 34 is used for determining whether an echo from the edge of air is too large.

Thus, according to the structure of the conventional echo canceller, when an echo is not large, the operation can be processed smoothly. However, when the echo is large and the echo has a magnitude larger than half the power of the edge of line, it is thus determined that the edge of air is talked even though the edge of air is untalked, so that the adaptive filter cannot be turned on and the echo cannot be eliminated effectively.

SUMMARY OF THE INVENTION

The invention provides a method for canceling echo. First, a threshold value signal is set to a preset value and the threshold value signal and a medium value signal are kept at a level of the preset value. Then, whether a difference between an echo signal (I) and the medium value signal (I-1) is more than a positive threshold value or less than a negative threshold value is determined. When the difference between an echo signal (I) and the medium value signal (I-1) is more than the positive threshold value, the level of the medium value signal (I) is increased by an upraise speed and the level of the threshold value signal (I) is increased by a first speed faster than the upraise speed. When the difference between the echo signal (I) and the medium value signal (I-1) is less than the negative threshold value, the level of the medium value signal (I) is decreased by a drop speed and the level of the threshold value signal (I) is decreased by a second speed faster than the drop speed. When the difference between the echo signal (I) and the medium value signal (I-1) is not more than the positive threshold value or not less than the negative threshold value, which represents the level of the echo signal (I) in an normal range without adjusting the threshold value, the symbol (I) represents a present condition of a corresponding signal and the symbol (I-1) represents a previous condition of a corresponding signal.

A method for canceling echo according to the invention is described, which method can successfully eliminate the echo by turning on the adaptive filter in the echo canceller through the voice detector when an echo is large.

Both the foregoing general description and the following detailed description are exemplary and explanatory only and are not restrictive of the invention, as claimed.

DESCRIPTION OF THE PREFERRED EMBODIMENTS

The present invention provides a method that can effectively eliminate an echo when the echo is large. The detailed description of the invention is described as below.

Figure 3:
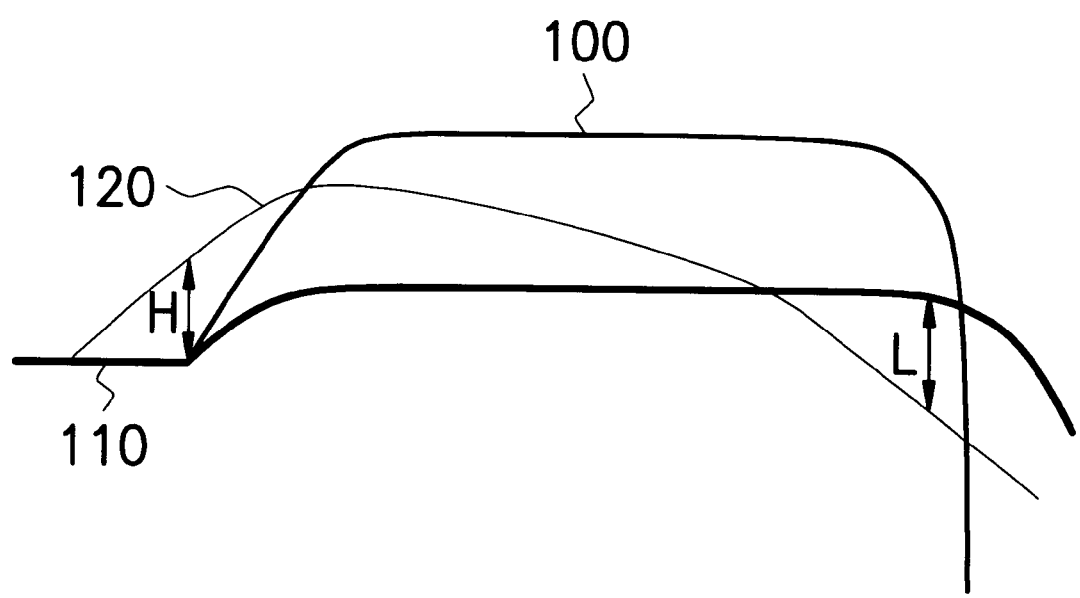
FIG. 3 shows a waveform fluctuation of a preferred embodiment of a method for canceling echo according to the invention.
Figure 4:
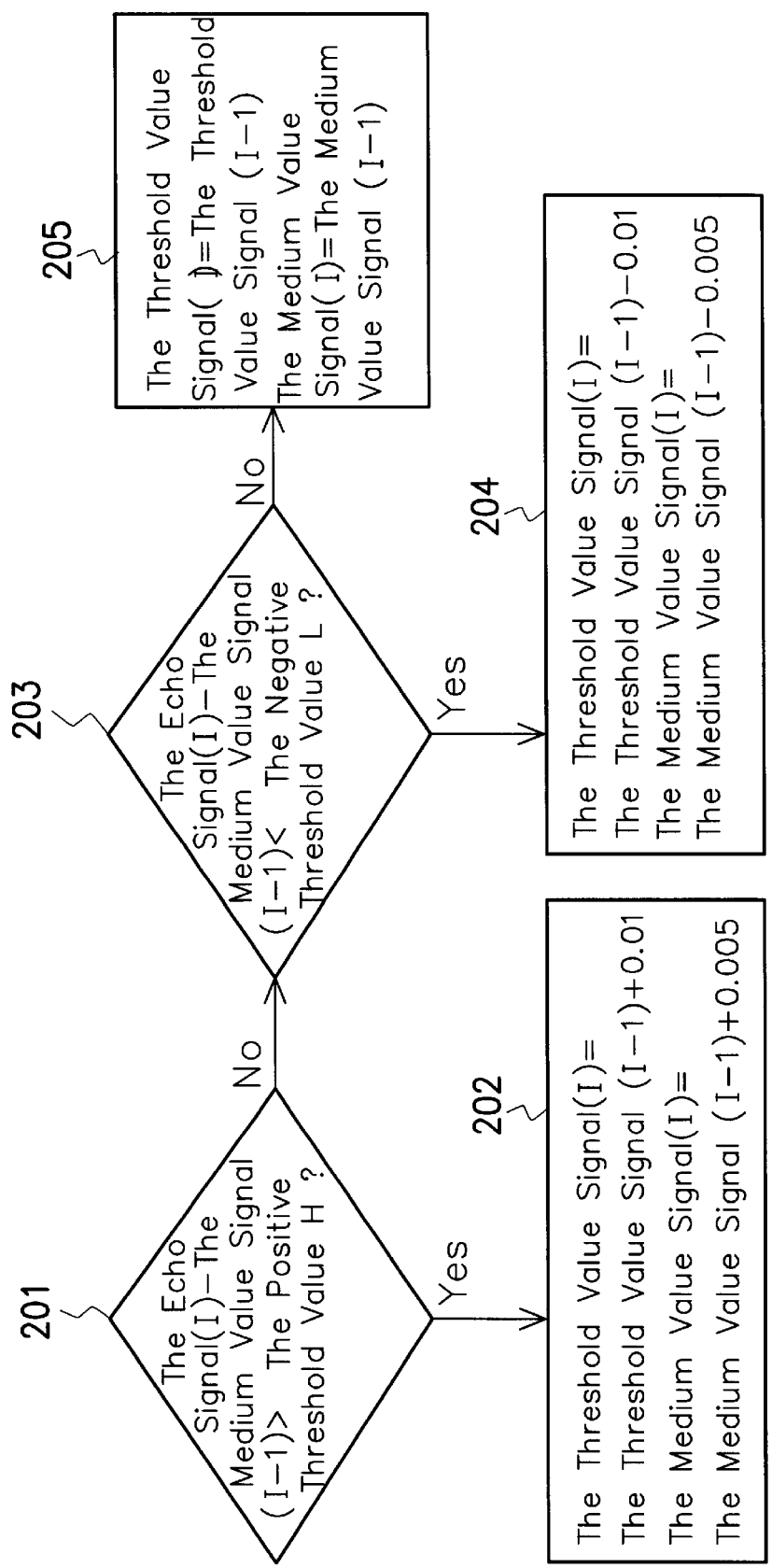
FIG. 4 shows a flowchart of a preferred embodiment of a method for canceling echo according to the invention.

Reference is made to FIG. 3 and FIG. 4. FIG. 3 shows a waveform fluctuation of a preferred embodiment of a method for canceling echo according to the invention, and FIG. 4 shows a flowchart of a preferred embodiment of a method for canceling echo according to the invention.

In FIG. 3, the reference number 100 represents a waveform fluctuation of an threshold value signal, the reference number 110 represents a waveform fluctuation of a medium value signal, and the reference number 120 represents a waveform fluctuation of an echo signal. In the following description, the symbol (I) represents a present condition of a signal and the symbol (I-1) represents a previous condition of a signal.

First, the threshold value signal 100 is set to a preset value and the threshold value signal 100 and the medium value signal 110 are keep at the level of the preset value.

Then, a diagnosis is made as to whether a difference between the echo signal (I) 120 and the medium value signal (I-1) 110 is more than a positive threshold value H S201). If the difference between the echo signal (I) 120 and the medium value signal (I-1) 110 is more than the positive threshold value H (that is, the echo signal (I) 120–the medium value signal (I-1) 110>the positive threshold value H), the echo is very large. Thereafter, the method proceeds to process S202. In process S202, the level of the medium value signal (I) 110 is increased (for example, the medium value signal (I) 110=the medium value signal (I-1) 110+ 0.005) and the level of the threshold value signal (I) 100 is increased by, for example, about double the speed of the medium value signal (I) 110 (for example, the threshold value signal (I) 100=the threshold value signal (I-1) 100+ 0.01).

In contrast, the difference between the echo signal (I) 120 and the medium value signal (I-1) 110 is less than a negative threshold value L (that is, the echo signal (I) 120–the medium value signal (I-1) 110<the negative threshold value L) (S203). The method then proceeds to process S204. In process of S204, the level of the medium value signal (I) 110 is decreased (for example, the medium value signal (I) 110=the medium value signal (I-1) 110–0.005) and the level of the threshold value signal (I) 100 is decreased by about double the speed of the medium value signal (I) 110 (for example, the threshold value signal (I) 100=the threshold value signal (I-1) 100–0.01).

The object of increasing or decreasing the threshold value signal (I) 100 by a speed (for example, about double the speed of the medium value signal (I) 110) is to ensure that the result of the final increase or decrease can exceed the echo signal (I-1) 120, so that the echo can be eliminated effectively.

When the difference between the echo signal (I) 120 and the medium value signal (I-1) 110 is not more than the positive threshold value H and the difference between the echo signal (I) 120 and the medium value signal (I-1) 110 is not less than the negative threshold value L, then the method proceeds to process S205, which represents the level of the echo signal (I) 120 in the normal range without adjusting the threshold value. Here, the threshold value signal (I) 100 corresponds to the threshold value signal (I-1) 100 and the medium value signal (I) 110 corresponds to the medium value signal (I-1) 110.

Figure 1:
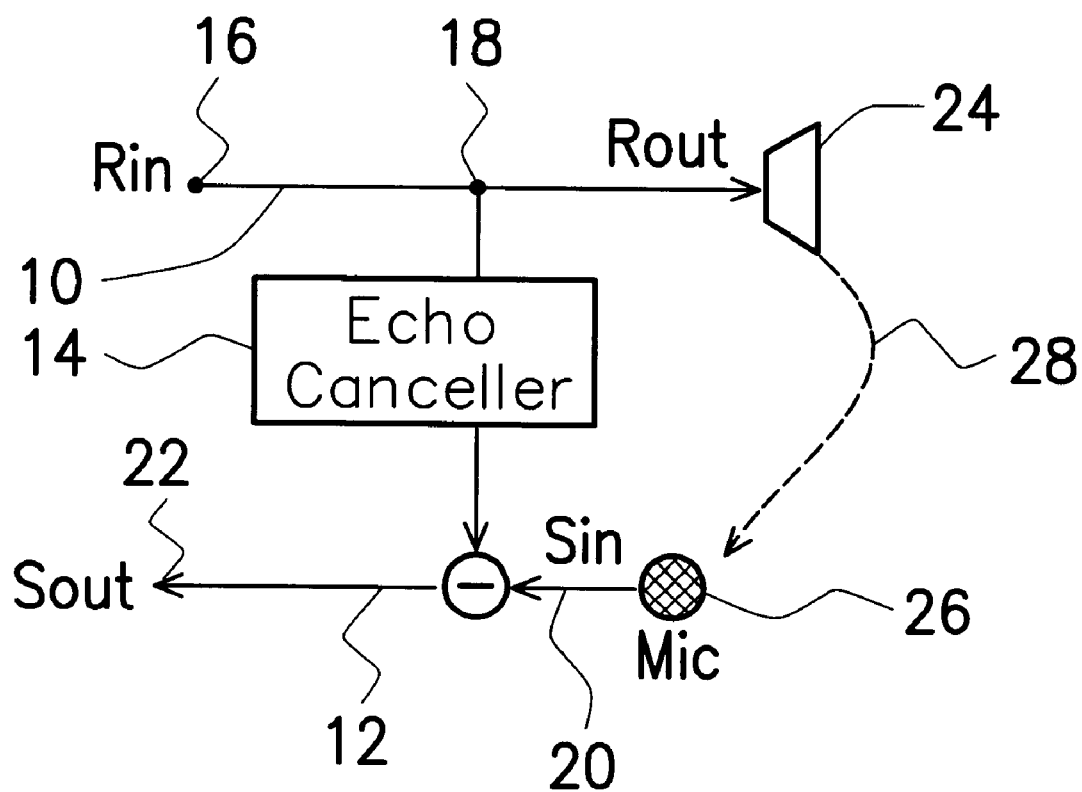
FIG. 1 shows a conventional echo canceller.
Figure 2:
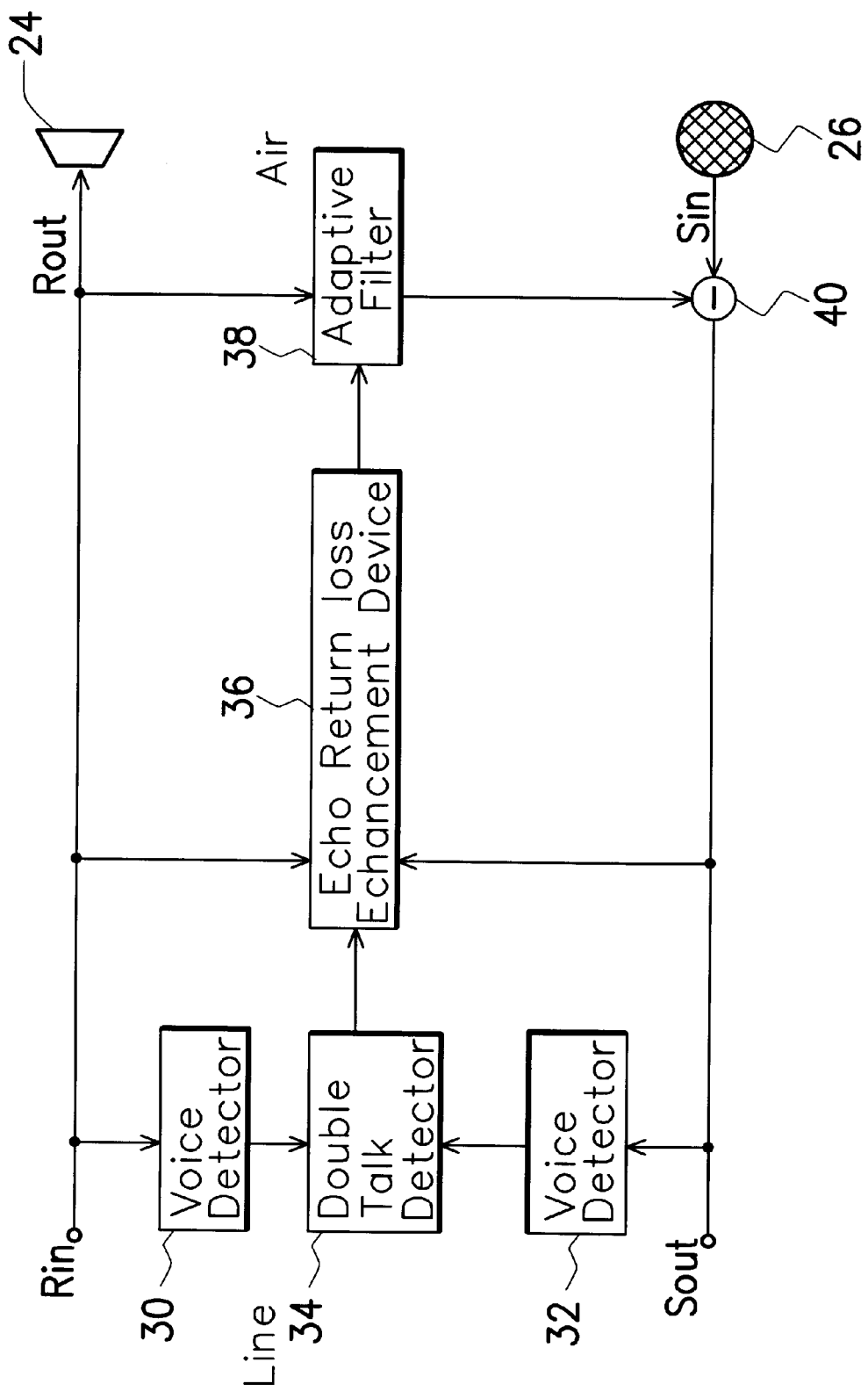
FIG. 2 shows a detailed structure of a conventional echo canceller in FIG. 1.

The voice detectors 30 and 32 of FIG. 2 can implement the processes in FIG. 4, that is, the voice detectors 30 and 32 have a diagnosis path as shown in FIG. 4, which can decide whether to turn on the adaptive filter 38 based on the diagnosis path.

Accordingly, the method for canceling echo of the invention can successfully eliminate echo by turning on the adaptive filter in the echo canceller through the voice detector when an echo is large.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A method for canceling echo, comprising:

setting a threshold value signal to a preset value, wherein the threshold value signal and a medium value signal are kept at a level of the preset value;

diagnosing whether a difference between an echo signal (I) and the medium value signal (I-1) is more than a positive threshold value and whether the difference between the echo signal (I) and the medium value signal (I-1) is less than a negative threshold value; and increasing a level of the medium value signal (I) when a difference between an echo signal (I) and the medium value signal (I-1) is more than the positive threshold value by a upraise speed and increasing the level of the threshold value signal (I) by a first speed faster than the upraise speed;

determining the level of the threshold value signal (I) when a difference between the echo signal (I) and the medium value signal (I-1) is less than the negative threshold value, decreasing the level of the medium value signal (I) by a drop speed and decreasing the level of the threshold value signal (I) by a second speed faster than the drop speed;

wherein the difference between the echo signal (I) and the medium value signal (I-1) is not more than the positive threshold value and the difference between the echo signal (I) and the medium value signal (I-1) is not less than the negative threshold value, which represents the level of the echo signal (I) in an normal range without adjusting the threshold value; and wherein the symbol (I) represents a present condition of a corresponding signal and the symbol (I-1) represents a previous condition of a corresponding signal.

2. The method for canceling echo according to claim 1, wherein when the difference between an echo signal (I) and the medium value signal (I-1) is more than the positive threshold value, the medium value signal (I)=the medium value signal (I-1)+0.005 and the threshold value signal (I)=the threshold value signal (I-1)+0.01.

3. The method for canceling echo according to claim 1, wherein the first speed is about double speed than the upraise speed.

4. The method for canceling echo according to claim 1, wherein when the difference between the echo signal (I) and the medium value signal (I-1) is less than the negative threshold value, the medium value signal (I)=the medium value signal (I-1) 110–0.005 and the threshold value signal (I)=the threshold value signal (I-1)–0.01.

5. The method for canceling echo according to claim 1, wherein the second speed is about double the drop speed.

6. The method for canceling echo according to claim 1, wherein when the difference between the echo signal (I) and the medium value signal (I-1) is not more than the positive threshold value and the difference between the echo signal (I) and the medium value signal (I-1) is not less than the negative threshold value, the threshold value signal (I) corresponds to the threshold value signal (I-1) and the medium value signal (I) corresponds to the medium value signal (I-1).

7. The method for canceling echo according to claim 1, wherein the method for canceling echo is implemented by a voice detector and the voice detector can decide whether to turn on an adaptive filter to eliminate the echo based on the method for canceling echo.

* * * * *